United States Patent
Sever et al.

(10) Patent No.: US 9,969,104 B2
(45) Date of Patent: May 15, 2018

(54) AUTOMATIC CONTROL OF ASSEMBLIES OF A WATER SUPPLY SYSTEM

(71) Applicant: Hilti Aktiengesellschaft, Schaan (LI)

(72) Inventors: Eduard Sever, Ludesch (AT); Hans Rupprecht, Munich (DE); Helmut Specht, Bad Woerishofen (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days. days.

(21) Appl. No.: 15/321,955

(22) PCT Filed: Jun. 24, 2015

(86) PCT No.: PCT/EP2015/064209
§ 371 (c)(1),
(2) Date: Dec. 23, 2016

(87) PCT Pub. No.: WO2015/197667
PCT Pub. Date: Dec. 30, 2015

(65) Prior Publication Data
US 2017/0129138 A1     May 11, 2017

(30) Foreign Application Priority Data

Jun. 25, 2014   (EP) .................................... 14173823

(51) Int. Cl.
*B28D 7/02*         (2006.01)
*B28D 1/04*         (2006.01)
(Continued)

(52) U.S. Cl.
CPC .............. *B28D 7/02* (2013.01); *B28D 1/041* (2013.01); *B28D 7/005* (2013.01); *G05B 19/406* (2013.01);
(Continued)

(58) Field of Classification Search
CPC .... G01D 5/12; G01L 1/18; G01L 3/02; G01R 1/0408; G01R 1/44; G01R 31/00;
(Continued)

(56) References Cited

U.S. PATENT DOCUMENTS 7,093,651 B2 * 8/2006 Meyers ................... E21B 33/00
166/85.2
2008/0087333 A1 * 4/2008 Pfeiffer .................. B01D 29/27
137/547

(Continued)

FOREIGN PATENT DOCUMENTS

DE   10 2006 035 345 A1   4/2008
EP        2 335 897 A1    6/2011
JP        3-221348 A      9/1991

OTHER PUBLICATIONS

Izawa Motoo + (Izawa Motoo, Cutting Hydraulic Power Checking Circuit Structure, Mar. 28, 1991, JPH0373249.*
(Continued)

*Primary Examiner* — Harshad R Patel
*Assistant Examiner* — Brandi Hopkins
(74) *Attorney, Agent, or Firm* — Crowell & Moring LLP

(57) ABSTRACT

A method for controlling a water supply system for use with a machine tool is disclosed. The water supply system includes a housing with an interface for supplying electrical energy, a water tank, a line, a pump device, a current-measuring device, a water-pressure-measuring device, and a control device. The method includes activating the pump device if the machine tool is connected to the interface and the motor current of the machine tool exceeds a predetermined threshold value, and deactivating the pump device if the machine tool is connected and the motor current undershoots a predetermined threshold value; or activating the pump device if the machine tool is not connected and the water pressure in the line undershoots a predetermined
(Continued)

threshold value and deactivating the pump device if the machine tool is not connected and the water pressure exceeds a predetermined threshold value.

4 Claims, 2 Drawing Sheets

(51) Int. Cl.
*B28D 7/00* (2006.01)
*G05D 7/06* (2006.01)
*G05B 19/406* (2006.01)

(52) U.S. Cl.
CPC . *G05D 7/0676* (2013.01); *G05B 2219/24015* (2013.01)

(58) Field of Classification Search
CPC ............... B81C 99/005; G01N 3/42; G01N 2203/0051; G01N 2203/0617; G01N 19/00; G01N 3/40; G01N 2203/0286; G01Q 60/366; Y10S 977/956; G01B 7/34; G01B 5/28; G02B 21/34; G02B 21/241; G02B 21/0036; G02B 21/365; G02B 21/006
USPC ................. 73/81, 105, 866.5, 800, 826, 833
See application file for complete search history.

(56) References Cited

U.S. PATENT DOCUMENTS

| | | | |
|---|---|---|---|
| 2011/0192803 A1* | 8/2011 | Holzmeier | B01D 21/0012 210/741 |
| 2017/0136656 A1* | 5/2017 | Specht | B28D 7/02 |

OTHER PUBLICATIONS

PCT/EP2015/064209, International Search Report (PCT/ISA/220 and PCT/ISA/210) dated Jul. 24, 2015, with partial English translation, enclosing Written Opinion of the International Searching Authority (PCT/ISA/237) (Thirteen (13) pages).

* cited by examiner

AUTOMATIC CONTROL OF ASSEMBLIES OF A WATER SUPPLY SYSTEM

This application claims the priority of International Application No. PCT/IEP2015/064209, filed Jun. 24, 2015, and European Patent Document No. 14173823.7, filed Jun. 25, 2014, the disclosures of which are expressly incorporated by reference herein.

BACKGROUND AND SUMMARY OF THE INVENTION

The present invention relates to a method for controlling a water supply system for use with a machine tool, in particular a core drilling machine, containing a housing with at least one interface for supplying the machine tool with electrical energy, a water tank for storing water in a positionable manner in the housing, at least one line for transporting water from the water tank to the machine tool, at least one pump device for conveying water from the water tank to the machine tool, a current measuring device for measuring the motor current on the machine tool, a water-pressure measuring device for measuring a water pressure in the line and a control device.

Water supply systems (water treatment systems or water recycling systems are also considered water supply systems) are an essential and indispensable necessity in almost all core drilling work as well as in numerous other types of work with large machine tools. Instead of attaching a core drilling machine to a fresh water line which cools the drill bit when processing the material and washes away the rock detached by the drill bit and the dust somewhere, a water supply system provides a water supply for cooling and rinsing. A water supply system designed as a water treatment system also offers the possibility of continuously reusing a specific water supply in a so-called infinite loop. For this purpose, the water supply system designed as a water treatment system has a fresh water tank, in which a specific quantity of water is stored for cooling and rinsing. The water treatment system also has a drilling mud tank, in which the drilling mud that accrues from the rock, dust and water is collected. In this connection, the water can be filtered out of the drilling mud by means of a corresponding filter and be conveyed to the fresh water tank again, where it can be conveyed once more to the core drilling device and the drill bit.

A water supply system for use with a machine tool, such as, for example, a core drilling machine, according to the prior art is disclosed in German Patent Application DE 10 9006 035 345 A1 for example.

Core drilling work is complex and requires that various parameters be monitored and adjusted during preparations as well as during the entire time the actual drilling process is being carried out. Among other things, the gearing of the core drilling device, the drilling speed, the torque, the drilling progress and the water quantity that is required for cooling and rinsing must be changed and adjusted. In the case of a water treatment system, the adjustment of the conveyed water quantity for cooling and rinsing in particular is a laborious issue, which frequently causes the user to interrupt the actual drilling process or at the least to conduct it in a manner that is not as efficient and quick as would be possible under optimum conditions. In addition, it is possible that that the core drilling process must be interrupted deliberately by the user for a short time. In the case of such an interruption, not just the core drilling device has to be decelerated and shut off, but also the water treatment system must be shut off or the conveyed water quantity reduced. Simultaneously handling all these settings or adjustments on the core drilling device and on the water treatment system can easily overburden the user so that errors in operation and/or damage to the material being processed or the equipment can occur.

In addition it must be noted that a water supply system, and especially one designed as a water treatment system, has a relatively high energy consumption, because frequently all assemblies or electrically operated components are kept on standby during the entire core drilling process and therefore consume electrical current.

Therefore, the object of the present invention is to solve the problems described above and in particular to make available a method for controlling a water supply system for use with a machine tool, in particular a core drilling machine, with which the operation of a core drilling process can be facilitated on the one hand, and with which the energy consumption of a water supply system along with its assemblies can be controlled efficiently on the other.

To this end, a method is made available for controlling a water supply system for use with a machine tool, in particular a core drilling machine, containing a housing with at least one interface for supplying the machine tool with electrical energy, a water tank for storing water in a positionable manner in the housing, at least one line for transporting water from the water tank to the machine tool, at least one pump device for conveying water from the water tank to the machine tool, a current measuring device for measuring the motor current on the machine tool, a water-pressure measuring device for measuring a water pressure in the line and a control device.

The method is characterized according to the invention by the following steps:

- Activation of the pump device for conveying water from the water tank to the machine tool if the machine tool is connected to the interface and the motor current of the machine tool exceeds a predetermined threshold value;
- Deactivation of the pump device for conveying water from the water tank to the machine tool if the machine tool is connected to the interface and the motor current of the machine tool undershoots a predetermined threshold value; or
- Activation of the pump device for conveying water from the water tank to the machine tool if the machine tool is not connected to the interface and a water pressure in the line undershoots a predetermined threshold value;
- Deactivation of the pump device for conveying water from the water tank to the machine tool if the machine tool is not connected to the interface and a water pressure in the line exceeds a predetermined threshold value.

The operation of the pump device or the water supply system can hereby be operated by remote control without the user having to leave the machine tool. In addition, the pump device of the water treatment system is only activated or operated when water is actually required at the machine tool for cooling or rinsing in accordance with the manner in which the core drilling machine is supplied with electrical energy.

Additional advantages are yielded from the following description of the figures. Different exemplary embodiments of the present invention are depicted in the figures. The figures, the description and the claims contain numerous features in combination. A person skilled in the art will also expediently consider the features individually and integrate them into other meaningful combinations.

DETAILED DESCRIPTION OF THE DRAWINGS

Figure 1:
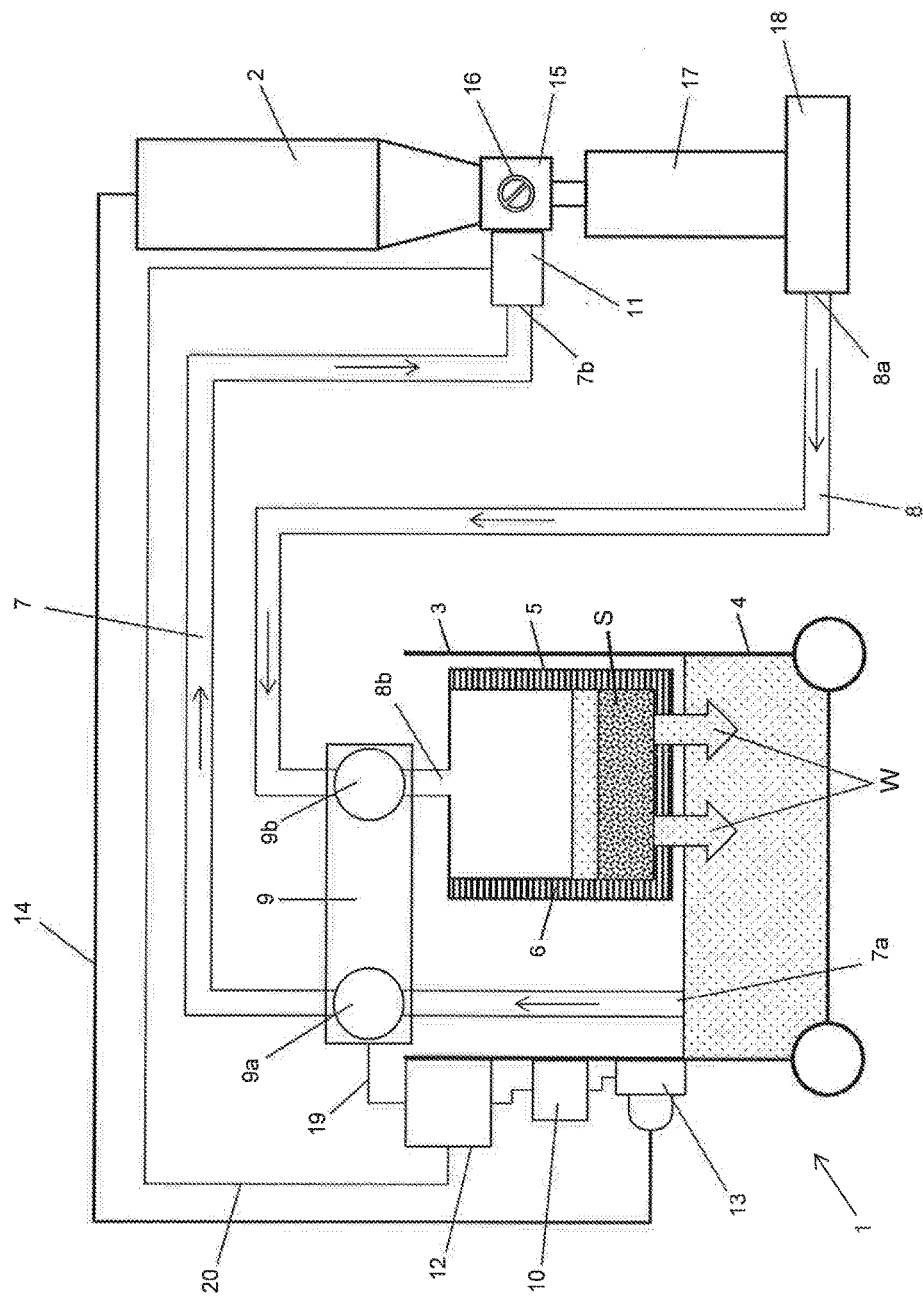
FIG. 1 is a schematic representation of a water supply system designed as a water treatment system and a core drilling machine for carrying out the method according to the invention for controlling the water treatment system with the supply of the core drilling machine via the interface on the housing of the water treatment system.
Figure 2:
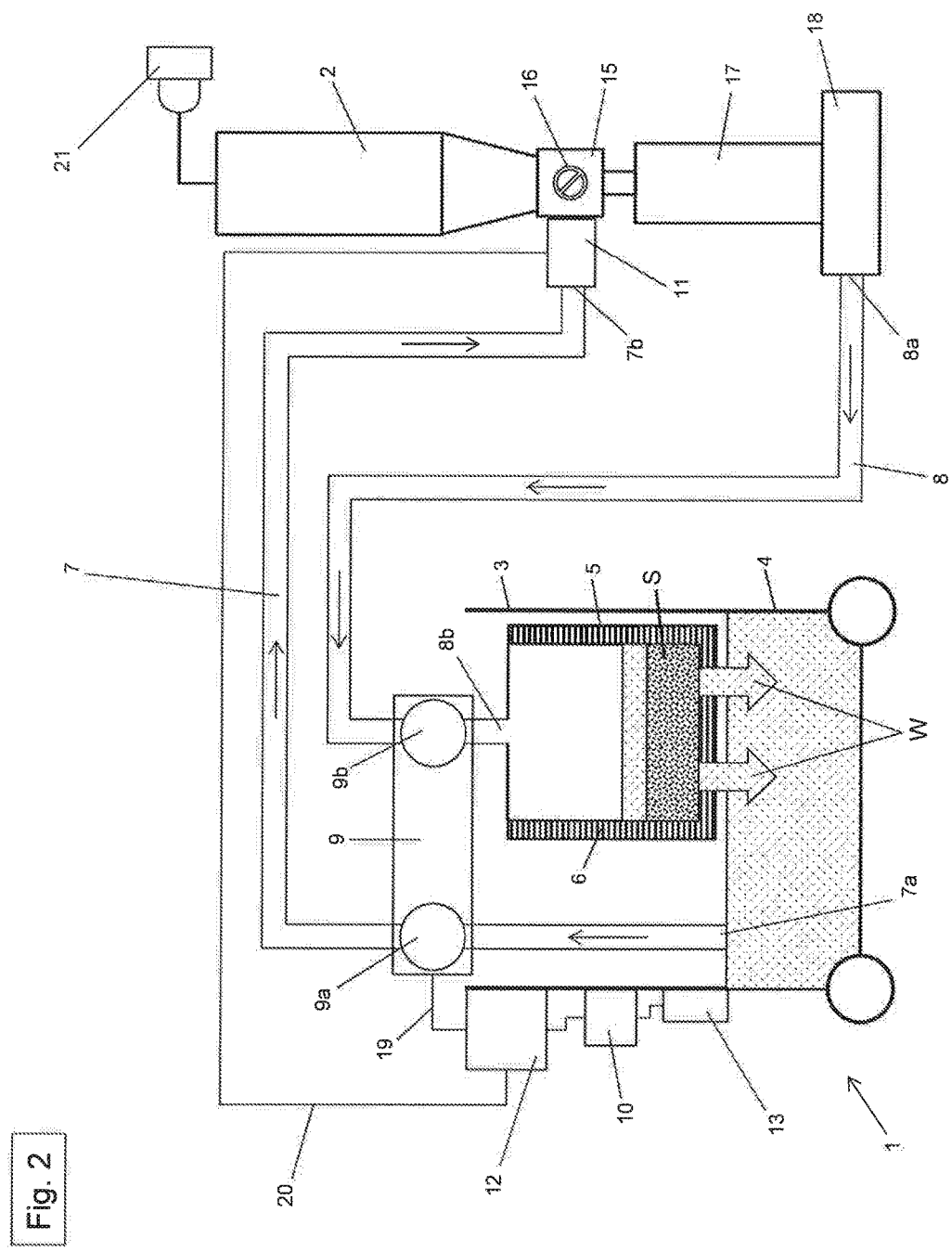
FIG. 2 is schematic representation of a water supply system designed as a water treatment system and a core drilling machine for carrying out the method according to the invention for controlling the water treatment system with the supply of the core drilling machine via a separate interface.

FIG. 1 and FIG. 2 show a water supply system 1 designed as a water treatment system, which is connected to a machine tool. 2 designed as a core drilling machine. The core drilling machine 2 is connected to a tool 17 designed as a drill bit. The water supply system 1 designed as a water treatment system is designed to carry out the method according to the invention.

The water treatment system 1 substantially contains a housing 3, a water tank 4, a drilling mud tank 5, a filter 6, a first line 7, a second line 8, a pump device 9, a current measuring device 10, a water-pressure measuring device 11 and a control device 12.

According to an alternative embodiment which is not shown, the water supply system can be designed as a pure supply system without a water treatment function or a water recycling function, which merely makes a specific water supply available to an attached machine tool (such as, for example, a core drilling machine) for cooling and rinsing. Such a water supply system without a water treatment function or without a water recycling system does not contain a drilling mud tank or a second line for transporting the drilling mud away from the machine tool to the drilling mud tank. As an alternative to this, a water supply system can also be provided, which contains a drilling mud tank and a second line for transporting drilling mud from the machine tool to the drilling mud tank, in which the water treatment function or water recycling function can be deactivated, however. In other words, the water supply system with a water treatment function or a water recycling function described in the following can also be operated such that merely the fresh water is pumped out of the water tank to the drill bit for cooling and rinsing, however, without reclaiming the water from the drilling mud and transporting it back (i.e., in a continuous loop) to the drill bit. The water supply system described in the following can be operated both with a water treatment function or a water recycling function as well as without a water treatment function or a water recycling function.

The housing 3 is designed substantially as a hollow body. In addition, the housing 3 contains on an exterior an interface 13 for supplying it with electrical energy.

The core drilling machine 2 can be connected to the water treatment system 1 via the interface 13 by means of a power line 14 for supplying electrical energy.

Both the water tank 4 and the drilling mud tank 5 are positioned in the housing 3.

The water tank 4 is used to store a supply of fresh water for cooling and rinsing.

The drilling mud tank 5 is designed substantially in the form of a cylindrical container. The side walls as well as the base are configured as filters 6 and therefore consist of a filter-like material, which is suited to hold back the drilling mud S and allow merely water W to permeate. The drilling mud tank 5 and the water tank 4 are positioned relative to each other in particular such that the water which exits from the filter 6 of the drilling mud tank 5 is collected in the water tank 4. As FIGS. 1 and 2 show, the drilling mud tank 5 is situated above the water tank 4.

The first line 7 is designed in the form of a flexible hose and contains a first end 7a as well as a second end 7b. The first end 7a of the first line 7 projects into the water tank 4. The second end 7b of the first line 7 is connected to a connecting piece 15 on the core drilling machine 2. The connecting piece 15 contains a valve 16, which with the flow through the first line 7 can be opened and closed. The open position of the valve 16 is used to allow water to get through the first line 7 to the tool 17 designed as a drill hit. The closed position of the valve 16 is used to keep water from getting through the first line 7 to the drill bit 17. The first line 7 is used to transport fresh water from the water tank 4 to the drill bit 17. As depicted in FIGS. 1 and 2, the first line 7 is connected to the core drilling machine 2 via the connecting piece 15 such that the water reaches the interior of the drill bit 17. The water cools and rinses the drill bit 17 during a drilling process. In accordance with an alternative embodiment, it can also be provided that the first line 7 is guided first through the core drilling machine 2 for cooling before it then reaches the drill bit 17 for cooling and rinsing.

The second line 8 is likewise designed in the form of a flexible hose and contains a first end 8a and a second end 8b. The first end 8a of the second line 8 is connected to a collection device 18. The collection device 18 is positioned at the end of the drill hit 17 and is used to collect the drilling mud (rock, dust and water) that accrues during the drilling process. The second end 8b of the second line 8 is connected to the drilling mud tank 5 such that the drilling mud is able to reach the drilling mud tank 5 from the collection device 18 via the second line 8.

The pump device 9 contains a first pump section 9a and a second pump section 9b. The first pump section 9a is connected to the first line 7 and is used to convey or pump fresh water from the water tank 4 to the drill bit 17. The second pump section 9b is connected to the second line 8 and is used to convey or pump drilling mud from the collection device 18 into the drilling mud tank 5.

According to an alternative embodiment, it is also possible for the first and second pump sections 9a, 9b or the pump for the fresh water and the pump for the drilling mud not to be positioned together in the pump device 9, but somewhere else at a suitable location in the water treatment system 1.

The current measuring device 10 is connected to the control device 12 as well as to the interface 13 for supplying electrical energy and is used for measuring the electrical current strength at the interface 13. In particular, the current measuring device 10 can measure the current consumption of the core drilling machine 2 or the motor current of the core drilling machine 2, which is connected to the interface. The current strength measured on the control device 12 is transmitted via the connecting line 19.

The water-pressure measuring device 11 is positioned at the second end 7b of the first line 7 and is used for measuring the water pressure in the first line 7 as well as for measuring the water pressure applied to the core drilling machine 2 in particular. In addition, the water-pressure measuring device 11 is connected to the control device 12 via a connecting line 20 for data exchange. The water-pressure measuring device 11 can be designed thereby in the form of a pressure sensor.

According to an alternative embodiment, the water-pressure measuring device 11 can also be positioned at any other suitable location on the first line 7 in order to measure the water pressure in the first line 7.

The control device 12 is connected to the pump device 9, the current measuring device 10 and the water-pressure measuring device 11. The control device 12 thereby monitors, controls and regulates the pump device 9 as well as the first pump section 9a and the second pump section 9b. In addition, the control device 12 receives measured data from the current measuring device 10 and the water-pressure measuring device 11.

In addition, threshold values or limit values for the current measuring device 10 and water-pressure measuring device 11 are stored in the control device 12.

As FIGS. 1 and 2 show, the water treatment system 1 and the core drilling machine 2 can be operated in a first mode and in a second mode. FIG. 1 depicts the first mode and FIG. 2 depicts the second mode.

Interface 13 is connected for supplying electrical energy (e.g., wall socket). In both the first mode as well as the second mode, the core drilling machine 2 is connected to the first line 7 for supplying fresh water and to the second line 8 for transporting away the drilling mud.

To operate the water treatment system 1 in connection with the core drilling machine 2 in the first mode, the core drilling machine 2 is connected to the first line 7 and the second line 8 (see FIG. 1). Furthermore, the core drilling machine 2 is connected to the interface 13 of the water treatment system 1 for supplying electrical energy. Before the beginning of the actual core drilling process, both the core drilling machine 2 and the water treatment system 1 are switched on. At the beginning, the water treatment system 1 is in a standby mode, i.e., the pump device 9 along with the first pump section 9a and the second pump section 9b are switched on, but are not yet conveying any fresh water to the drill bit 17 or drilling mud away from the drill bit 17. Once the user (not shown) actuates the motor switch (not shown) on the core drilling machine 2 and the drill bit 17 begins to rotate, the pump device 9 along with the first pump section 9a for conveying fresh water and the second pump section 9b for conveying drilling mud are activated. The motor current of the care drilling machine 2 increases when the core drilling machine 2 is operated by actuating the motor switch. The increase in the motor current is measured at the interface 13 of the water treatment system 1 with the aid of the current measuring device 10 and is transmitted to the control device 12. The current value measured at the interface 13 is compared to the threshold values stored in the control device 10. If the measured current value exceeds a threshold value for longer than a specific time duration, the pump device 9 along with the first pump section 9a and the second pump section 9b are switched on so that fresh water is conveyed to the drill bit 17 and drilling mud is transported away from the drill bit 17. If the user briefly interrupts the core drilling process by switching off the core drilling machine 2 (i.e., by releasing the motor switch) or even completely terminates it, the motor current in the core drilling machine 2 drops again correspondingly. This drop in the motor current is measured at the interface 13 of the water treatment system 1 with the aid of the current measuring device 10 and is transmitted to the control device 12. The current value measured at the interface 13 is again compared with the threshold values stored in the control device 12. If the measured current value undershoots a threshold value for longer than a specific time duration, the pump device 9 along with the first pump section 9a and the second section 9b are switched off so that fresh water is no longer conveyed to the drill bit 17 and drilling mud is no longer transported away from the drill bit 17.

Because of this, the water treatment system 1 and in particular the pump device 9 can be controlled via the motor switch of the core drilling machine 2, whereby the user can remain at the core drilling machine 2 during the core drilling process and does not have to switch between the core drilling machine 2 and the water treatment system 1 to control the individual assemblies. In addition, the water treatment system 1 and in particular the pump device 9 are only activated when this is required and fresh water must be conveyed to the drill bit 17 and drilling mud must be transported away from the drill hit 17, thereby saving energy.

To operate the water treatment system 1 in connection with the core drilling machine 2 in the second mode, the core drilling machine 2 is connected to the first line 7 and the second line 8 (see FIG. 2). In contrast to the first mode, the core drilling machine 2 is not connected to the interface 13 of the water treatment system 1 for supplying electrical energy, rather to an external interface 21 for supplying electrical energy (i.e., wall socket). Because the core drilling machine 2 is not connected to the interface 13 of the water treatment system 1, an increase in the motor current also cannot be determined with the aid of the current measuring device 10 as proof of the operation of the core drilling machine 2. The water pressure that is applied on the second end 7b of first line 7, i.e., at the drill bit 17, is measured with the aid of the water-pressure measuring device 11. Before the actual beginning of the core drilling process, the valve 16 on the connecting piece 15 is opened so that fresh water can get from the first line 7 into the drill hit 17. The pressure in the first line 7 drops when the valve 16 is opened. The water-pressure measuring device 11 measures the drop in the water pressure in the first line 7 and transmits this via the connecting line 20 to the control device 12. Based on the decreased water pressure in the first line 7, the control device 12 transmits that the valve 16 is open and the actual core drilling process is started.

If the measured water pressure undershoots a specific water-pressure threshold value for longer than a specified time duration, the control device 12 thereupon transmits a corresponding signal to the pump device 9 so that it along with the first pump section 9a and the second pump section 9b are switched on.

If the core drilling process is terminated or the core drilling process is supposed to be interrupted briefly, the user closes the valve 16 on the connecting piece 15 so that fresh water can no longer get into the drill bit 17 and consequently the water pressure in the first line 7 increases. The increase in the water pressure is measured by the water-pressure measuring device 11 and is transmitted to the control device 12. If the measured water pressure exceeds a specific water-pressure threshold value for longer than a specified time duration, the control device 12 thereupon transmits a corresponding signal to the pump device 9 so that it along with the first pump section 9a and the second pump section 9b are switched off.

Because of this, the water treatment system 1 and in particular the pump device 9 can be controlled via the valve 16 of the connecting piece 15 on the core drilling machine 2, whereby the user can remain at the core drilling machine 2 during the core drilling process and does not have to switch between the core drilling machine 2 and the water treatment system 1 to control the individual assemblies. In addition, the water treatment system 1 and in particular the pump device 2 are only activated when this is required and fresh water must be conveyed to the drill bit 17 and drilling mud must be transported away from the drill bit 17, thereby saving energy.

The water supply system designed as a pure supply system without a water treatment function or a water recycling function can be operated in an identical manner as the water supply system with a water treatment function or a water recycling function described in the foregoing. The difference is merely that, in the case of the water supply system designed as a pure supply system without a water treatment function or a water recycling function, the drilling mud is not transported via a second line to the water supply system and the water in the drilling mud is not reused.

The invention claimed is:

1. A method for controlling a water supply system for use with a machine tool, the water supply system comprising:
   a housing with an interface for supplying the machine tool with electrical energy;
   a water tank for storing water in a positionable manner in the housing;
   a line for transporting the water from the water tank to the machine tool;
   a pump device for conveying the water from the water tank to the machine tool via the line;
   a current measuring device, wherein a motor current of the machine tool is measurable by the current measuring device;
   a water-pressure measuring device, wherein a water pressure in the line is measurable by the water-pressure measuring device; and
   a control device coupled to the pump device, the current measuring device, and the water-pressure measuring device;
   and comprising the steps of:
   activating the pump device if the machine tool is connected to the interface and the motor current of the machine tool exceeds a first predetermined threshold value; and
   deactivating the pump device if the machine tool is connected to the interface and the motor current of the machine tool undershoots a second predetermined threshold value.

2. The method according to claim 1, wherein the machine tool is a core drilling machine.

3. A method for controlling a water supply system for use with a machine tool, the water supply system comprising:
   a housing with an interface for supplying the machine tool with electrical energy;
   a water tank for storing water in a positionable manner in the housing;
   a line for transporting the water from the water tank to the machine tool;
   a pump device for conveying the water from the water tank to the machine tool via the line;
   a current measuring device, wherein a motor current of the machine tool is measurable by the current measuring device;
   a water-pressure measuring device, wherein a water pressure in the line is measurable by the water-pressure measuring device; and
   a control device coupled to the pump device, the current measuring device, and the water-pressure measuring device;
   and comprising the steps of:
   activating the pump device if the machine tool is not connected to the interface and the water pressure in the line undershoots a first predetermined threshold value; and
   deactivating the pump device if the machine tool is not connected to the interface and the water pressure in the line exceeds a second predetermined threshold value.

4. The method according to claim 3, wherein the machine tool is a core drilling machine.

* * * * *